US011178531B2

(12) United States Patent
Hawker et al.

(10) Patent No.: US 11,178,531 B2
(45) Date of Patent: Nov. 16, 2021

(54) LINK DEVICES USING THEIR RELATIVE POSITIONS

(71) Applicant: International Business Machines Corporation, Armonk, NY (US)

(72) Inventors: Samuel B. Hawker, Winchester (GB); Andrew Michael Lees, Ferndown (GB); Aaron James Collins, Southampton (GB); Aaron Tomor Robert Gashi, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/364,960

(22) Filed: Mar. 26, 2019

(65) Prior Publication Data
US 2020/0314626 A1 Oct. 1, 2020

(51) Int. Cl.
*H04W 8/00* (2009.01)
*G06T 7/246* (2017.01)
*G06T 7/70* (2017.01)
*G06K 9/00* (2006.01)
*H04W 76/10* (2018.01)
*H04W 64/00* (2009.01)

(52) U.S. Cl.
CPC ........ *H04W 8/005* (2013.01); *G06K 9/00664* (2013.01); *G06K 9/00711* (2013.01); *G06T 7/248* (2017.01); *G06T 7/70* (2017.01); *H04W 64/006* (2013.01); *H04W 76/10* (2018.02); *G06T 2207/10016* (2013.01)

(58) Field of Classification Search
CPC .................................. H04W 8/005; H04W 4/80
See application file for complete search history.

(56) References Cited

U.S. PATENT DOCUMENTS

| 9,170,318 | B1 | 10/2015 | Bozarth et al. |
| 9,576,364 | B1 | 2/2017 | Ge et al. |
| 2011/0184646 | A1 | 7/2011 | Wong et al. |
| 2013/0142384 | A1* | 6/2013 | Ofek ..................... H04W 4/023 382/103 |

(Continued)

FOREIGN PATENT DOCUMENTS

WO 2018189529 A1 10/2018

OTHER PUBLICATIONS

Hazas et al., "A Relative Positioning System for Co-located Mobile Devices," Usenix, 2005, 15 pages https://www.usenix.org/legacy/publications/library/proceedings/mobisys05/tech/full_papers/hazas/hazas_html/MobiSys2005.html.

(Continued)

*Primary Examiner* — Wen W Huang
(74) *Attorney, Agent, or Firm* — Rachel M. Yadlosky

(57) ABSTRACT

A method, system, and computer program product for identifying and linking communicating devices using live camera data includes: identifying a visible device that is visible to a linking device; identifying a connected device that is connected to the linking device; determining visible movement of the visible device; requesting video information from the connected device; calculating, using the video information, video movement of the connected device; determining that the visible movement matches the video movement; concluding, based on the determining, that the visible device is the connected device; and linking, based on the concluding, the visible device and the connected device.

20 Claims, 7 Drawing Sheets

(56) References Cited

U.S. PATENT DOCUMENTS

| | | | | |
|---|---|---|---|---|
| 2014/0193040 | A1* | 7/2014 | Bronshtein | G06T 7/246 |
| | | | | 382/107 |
| 2015/0085111 | A1* | 3/2015 | Lavery | H04N 7/183 |
| | | | | 348/143 |
| 2015/0341599 | A1* | 11/2015 | Carey | G06K 9/00342 |
| | | | | 348/150 |
| 2016/0371828 | A1* | 12/2016 | Demarty | G06T 7/20 |
| 2018/0164877 | A1* | 6/2018 | Miller | H04B 1/3827 |
| 2018/0315211 | A1 | 11/2018 | Chen et al. | |
| 2020/0092495 | A1* | 3/2020 | Siau | H04N 5/265 |

OTHER PUBLICATIONS

Brumitt et al., "EasyLiving: Technologies for Intelligent Environments," Printed Jan. 30, 2019, 12 pages http://citeseerx.ist.psu.edu/viewdoc/download?doi=10.1.1.87.8033&rep=rep1&type=pdf.

Wikipedia, "Outline of object recognition," Wikipedia The Free Encyclopedia, Printed Jan. 30, 2019, 10 pages https://en.wikipedia.org/wiki/Outline_of_object_recognition.

Wikipedia, "Match moving)," Wikipedia The Free Encyclopedia, Printed Jan. 30, 2019, 1 page https://en.wikipedia.org/wiki/Match_moving).

Fan et al., "When camera meets accelerometer: a novel way for 3d interaction of mobile phone," MobileHCI'12, Sep. 21-24, 2012, San Francisco, CA, USA, ACM 978-1-4503-1443-5/12/09.2012, 6 pages, https://www.researchgate.net/publication/262317757_When_camera_meets_accelerometer_A_novel_way_for_3D_interaction_of_mobile_phone.

Smith, "Determining Angular Frequency From Video, With a Generalized Fast Fourier Transform," Master's Thesis, Defense Technical Information Center, Mar. 2012, 48 pages, http://www.dtic.mil/docs/citations/ADA557236.

Wikipedia, "Video tracking)," Wikipedia The Free Encyclopedia, Printed Jan. 30, 2019, 1 page https://en.wikipedia.org/wiki/Video_tracking.

Wikipedia, "Kanade-Lucas-Tomasi feature tracker," Wikipedia The Free Encyclopedia, Printed Jan. 30, 2019, 7 pages, https://en.wikipedia.org/wiki/Kanade%E2%80%93Lucas%E2%80%93Tomasi_feature_tracker.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

LINK DEVICES USING THEIR RELATIVE POSITIONS

BACKGROUND

The present disclosure relates to communicating devices, and more specifically to identifying and linking communicating devices using live camera data.

SUMMARY

The present disclosure provides a computer-implemented method, system, and computer program product to identify and link communicating devices using live camera data. The method may include identifying a visible device that is visible to a linking device. The method may also include identifying a connected device that is connected to the linking device. The method may also include determining visible movement of the visible device. The method may also include requesting video information from the connected device. The method may also include calculating, using the video information, video movement of the connected device. The method may also include determining that the visible movement matches the video movement. The method may also include concluding, based on the determining, that the visible device is the connected device. The method may also include linking, based on the concluding, the visible device and the connected device.

The system may have one or more computer processors and may be configured to identify a visible device that is visible to a linking device. The system may also be configured to identify a connected device that is connected to the linking device. The system may also be configured to determine visible movement of the visible device. The system may also be configured to request video information from the connected device. The system may also be configured to calculate, using the video information, video movement of the connected device. The system may also be configured to determine that the visible movement matches the video movement. The system may also be configured to conclude, based on the determining, that the visible device is the connected device. The system may also be configured to link, based on the concluding, the visible device and the connected device.

The computer program product may include a computer readable storage medium having program instructions embodied therewith, the program instructions executable by a server to cause the server to perform a method. The method may include identifying a visible device that is visible to a linking device. The method may also include identifying a connected device that is connected to the linking device. The method may also include determining visible movement of the visible device. The method may also include requesting video information from the connected device. The method may also include calculating, using the video information, video movement of the connected device. The method may also include determining that the visible movement matches the video movement. The method may also include concluding, based on the determining, that the visible device is the connected device. The method may also include linking, based on the concluding, the visible device and the connected device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
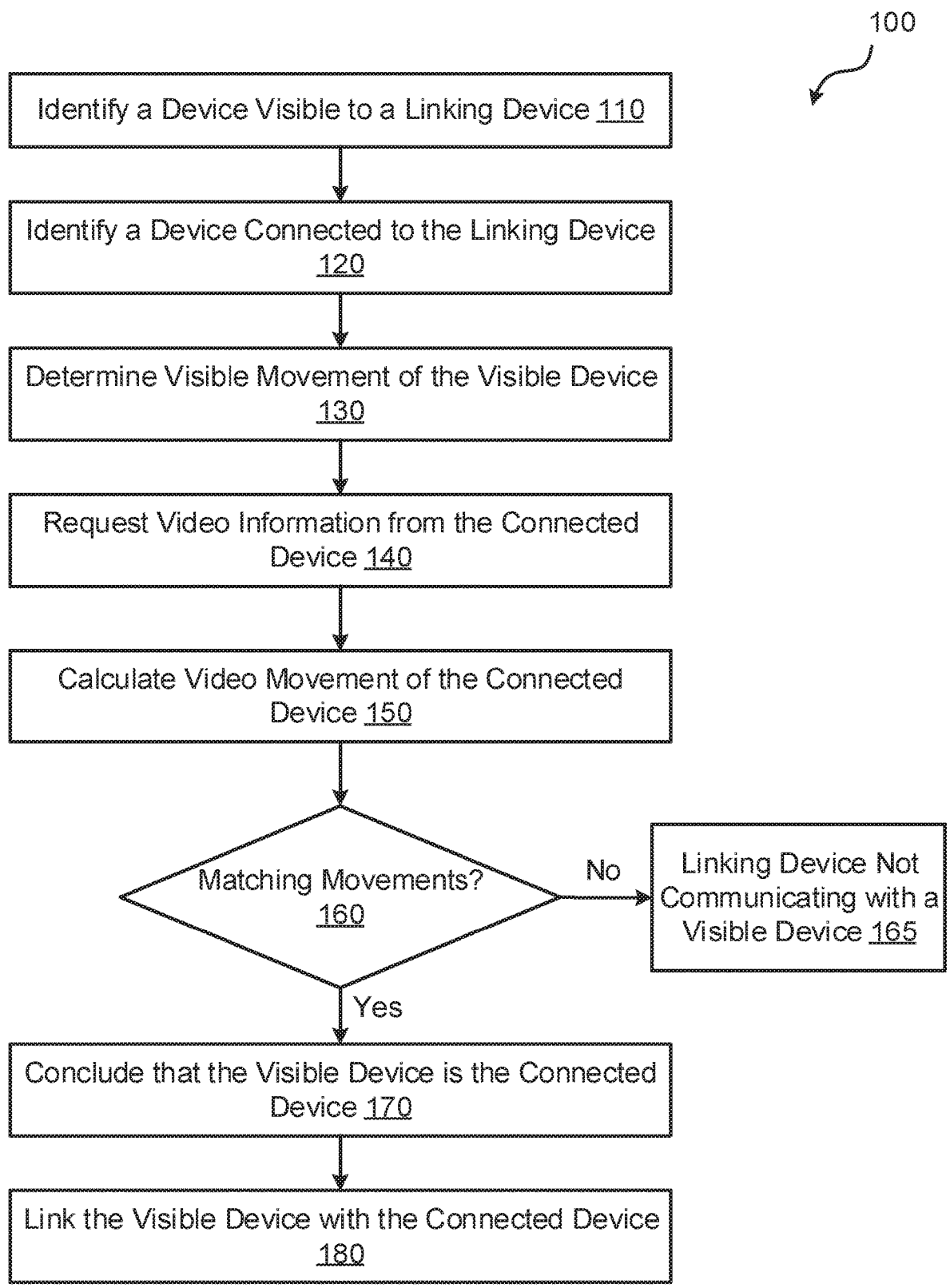
FIG. 1 depicts a flowchart of a set of operations for identifying and linking connected devices, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to communicating devices, and more specifically to identifying and linking communicating devices using live camera data. While the present disclosure is not necessarily limited to such applications, various aspects of the disclosure may be appreciated through a discussion of various examples using this context.

In some instances, a device (e.g., mobile phone, tablet, laptop, augmented reality headset/device, cars, etc.) may be communicating, or connected, with another device (i.e., connected device) in close proximity without knowing the identification of that device. This may lead to limited functionality, as the device does not know the specific positioning of the connected device. The devices may be too close for tracking systems (e.g., Global Positioning System (GPS)) to determine an accurate location for the connected device. Additionally, a signal strength between the two devices may be used to provide an estimate of distance, but this estimate may be inaccurate and may not calculate a relative position. In some embodiments, a device may know the type of device the connected device is expected to be (e.g., a mobile device, tablet, etc.), or even the specific make of the device, but trying to identify a device based on its type or make can be difficult and inaccurate because devices may have similar appearances or physical characteristics. Additionally, devices may have cases (e.g., a phone case, laptop case, etc.) that disguise their appearance.

The present disclosure provides a computer-implemented method, system, and computer program product to identify and link communicating devices using live camera data. In some embodiments, it is beneficial for a device to identify where other devices are positioned relative to itself. The device (i.e., linking device) may then be able to link a device (in this example, a visible device) it can visually detect in its camera with a device (in this example, a connected device)

it is able to communicate or connect with, or already communicating/connecting with. In other words, the linking device may be able to determine an accurate location, or position, of another device with which it is communicating using the camera of the linking device. With that accurate location, the linking device may "link" the connected device (e.g., associate the connected device with the visible device at the determined location). This may allow for added functionality such as device interaction through movements or gestures, gaining additional information about the surrounding area through the camera of the connected device, specific connecting and sending of data to the connected device alone, gaining other relevant information, or metadata, about the users of the devices through the device cameras, etc.

In some embodiments, linking the connected device and the visible device is connecting, or combining, data that the linking device has about the connected device with all the data about the visible device such that the all the data corresponds to a single device. For example, linking the connected device and the visible device may include merging together all the data known for each device record (i.e., the record for the visible device and the record for the connected device) to form a more complete data set for a single device record (e.g., the record for the connected device). Before the devices are linked, that the connected device and the visible device are the same device may be determined, based on the fact that the movements for each device match. Once the linking device determines that the connected device and the visible device are the same device, the linking device may link the two devices so that all the internal data the linking device has about each device is merged and combined together to become data for a single device. More specifically, the linking device may have location data for the visible device and may have communication, or connection, data for the connected device. Linking the connected device and the physical device may include connecting, or mapping, the communication data to the location data so that both the communication data and location data are known for the single, same, device (e.g., the connected device). For example, linking the devices may include mapping the network ID of the connected device to the physical location of the visible device (determined using the camera of the linking device).

Figure 5:
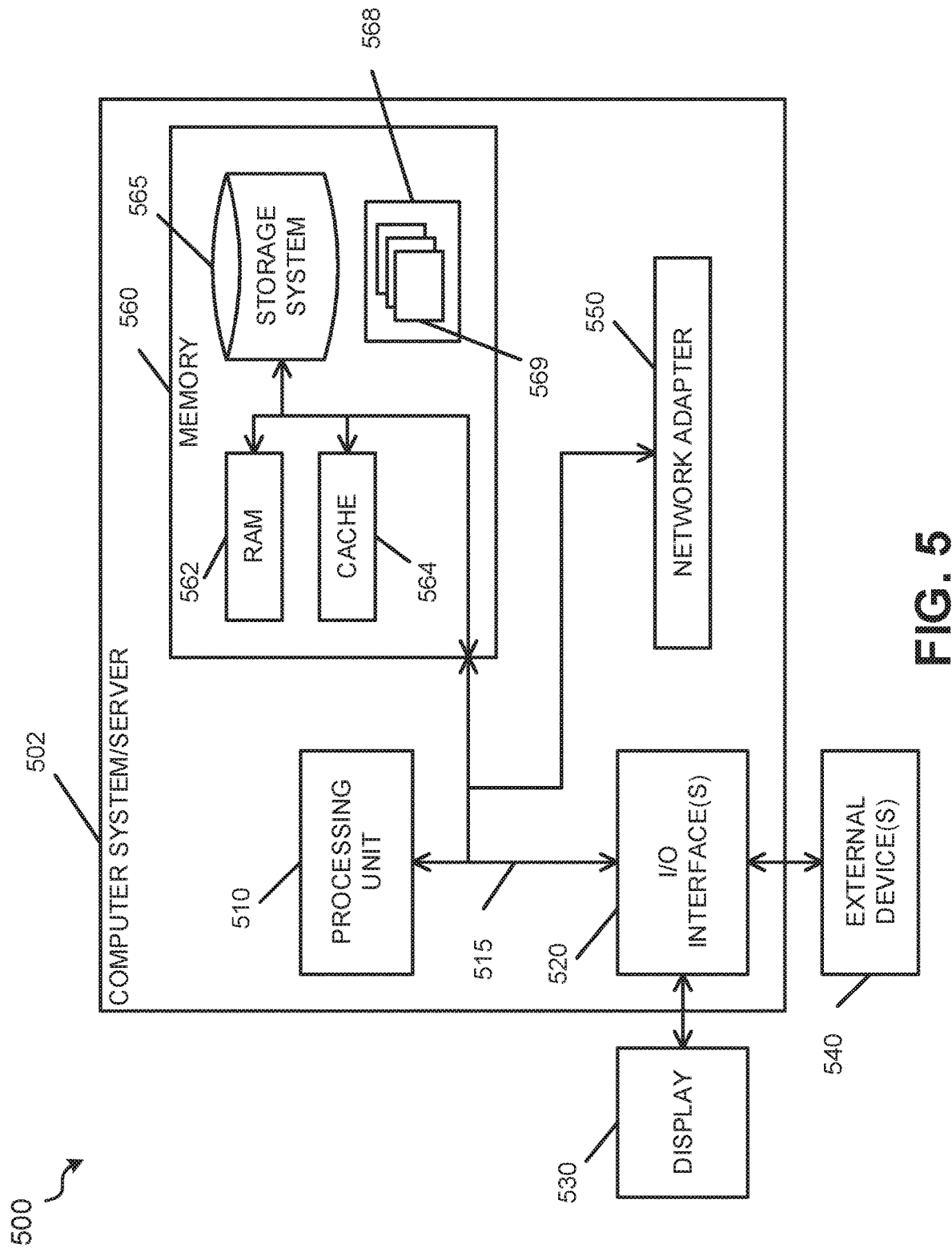
FIG. 5 depicts a block diagram of a sample computer system, according to some embodiments.

Referring now to FIG. 1, a flowchart illustrating a method 100 for identifying and linking connected devices is depicted, according to some embodiments. In some embodiments, the method 100 is implemented as a computer script or computer program (e.g., computer executable code) to be executed by a server on or connected to a computer system (e.g., computer system 500 (FIG. 5)). In some embodiments, the server is a computer device, such as computer system/server 502 (FIG. 5).

In some embodiments, a server is configured to execute operation 110 to identify a device (i.e., visible device) that is visible to a linking device. Multiple devices may be near each other (e.g., within the same room or geographic area) and may be able to send and receive data from each other (e.g., through a network). These devices may identify, or detect, that they are near each other, but do not have the exact location of the other device. In some embodiments, identifying a visible device includes locating devices that are visible to the linking device through a camera feed. For example, there may be three devices—a mobile device, a tablet, and a laptop—that are visible through the camera of a cell phone (the linking device, in this example). In some embodiments, a video feed from the camera of the linking device is constantly running and identifying devices. In some embodiments, the video feed is triggered (e.g., by the linking device, or by a user of the linking device) to start identifying devices.

In some embodiments, a server is configured to execute operation 120 to identify a device (in this example, a connected device) that is connected to the linking device. Identifying a device that is connected to the linking device may include determining that the linking device is communicating with, or connected to, a device, and identifying the device as the connected device. As discussed herein, a linking device may be communicating, or connected, with another device (i.e., a connected device) in close proximity without knowing the identification or location of that device. Determining the identification and/or location of the device may allow for added functionality for the linking device.

In some embodiments, a server is configured to execute operation 130 to determine visible movement of the visible device. Visible movement may be the movement of the visible device (or each visible device) detected by the camera, or the video feed from the camera, of the linking device. Determining the visible movement of the visible device may include monitoring the visible device and its movements through the camera of the linking device. In some embodiments, the visible movement is only determined for a visible device that includes a camera that is visible to the linking device (through the video feed). Because the connected device may have a camera with which it determined the video information, the visible device that could be the connected device may need to have a camera. In some embodiments, the camera of the linking device has a constantly running video feed, and the visible movement is determined using the constantly running video feed. In some embodiments, the visible movement is calculated using a video feed (from the camera of the linking device) that is activated by a trigger.

In some embodiments, determining visible movement includes using the video feed (e.g., a camera feed) from the camera of the linking device to calculate at least rotation, direction, and angular frequency of the visible device. The visible movement may be calculated using a video tracking technique, in some embodiments. Calculating the visible movement may include locating a feature object (e.g., the visible device or another object near the visible device) and tracking the feature object(s) through consecutive video frames from the camera feed of the linking device. In some embodiments, calculating the visible movement includes forming a movement path (i.e., visible movement path) for the visible device using monitoring data. The monitoring data may be data related to the movement of the visible device, obtained by monitoring the visible device via the camera of the linking device. In some embodiments, the movement path may include rotation, direction, and angular frequency of the visible device (calculated using the monitoring data). In some embodiments, a separate movement path may have been determined, or calculated, for rotation, direction, and angular frequency. The three movement paths (i.e., a rotation path, direction path, and angular frequency path) may be compiled and correlated in order to determine an overall visible movement path of the visible device.

In some embodiments, the linking device has information regarding the device type, or make, of the connected device. For example, the linking device may know that the device it is connected to is a mobile device, or even a specific make of a mobile device. In this instance, the linking device may only monitor visible devices that are the specific type, or make, of the connected device. The linking device may then ignore visible devices that are not the type, or make, of device that it is trying to identify, when monitoring and determining visible movement.

In some embodiments, a server is configured to execute operation 140 to request video information from the connected device. In some embodiments, the connected device grants full access to the raw data of a video stream from the camera of the connected device. In some embodiments, the connected device processes the data before it is sent (or before access is granted) to reduce the amount of data accessed and for potential privacy concerns. By processing the data first, the connected device may be able to limit the data that is given to the linking device.

In some embodiments, the video information is requested from all devices that the linking device is connected with (i.e., all available connected devices). In some embodiments, the linking device may have, at the time of this request, already linked one or more visible devices with one or more connected devices, so the visible device and its corresponding connected device are established as a single device. In this embodiment, the video information may only be requested from connected devices that are not already linked. In some embodiments, the video information is transferred between devices using media such as wireless internet, radio connection, network, cloud, etc.

In some embodiments, a server is configured to execute operation 150 to calculate video movement of the connected device. Video movement may be the movement of the connected device determined from the video information provided by the connected device. In some embodiments, there is only one connected device and the video movement of the one connected device is calculated using the video information provided by the one device. In some embodiments, there are multiple connected devices and the video movement for each connected device is calculated using the corresponding video information provided by each device. So, the video information provided by a connected device may be used to calculate the video movement for that specific connected device.

In some embodiments, calculating video movement includes using the video information (e.g., a camera feed) from the connected device to calculate at least rotation (i.e., movement of the device around a center of rotation) and translation (i.e., movement of the entire device a certain distance) of the connected device. In some embodiments, a "match moving" technique (a cinematic technique) is used to extract motion information from the video information/feed from the connected device. In some embodiments, the video information received by the user may include multiple frames of video. The frames may have a common feature, or object, that exists in the multiple frames. The feature, or features, may be used as reference points to help determine the movements of the connected device. To determine the movements, the feature, or features may be tracked (i.e., referenced, followed, traced, etc.) through multiple frames to determine how the feature varies (and stays the same) in each frame. In some embodiments, calculating the video movement may include tracking features of the video information to form motion tracks of the connected device and then calibrating the motion tracks in order to determine a path of the connected device. Motion tracks may be a series of points, or coordinates, that show the position of the feature throughout multiple frames. Calibrating the motion tracks may include correlating, or connecting, the motion tracks and the position of the feature to the movements of the connected device itself. Once the motion tracks (of the feature(s)) are calibrated with the movements of the connected device, a movement path (i.e., a route, track, or some visual representation of the movements) can be determined or created using the calibrations.

In some embodiments, when calculating a three dimensional path of the connected device, motion tracks of the rotation of the connected device may be calibrated with motion tracks of the translation of the connected device in order to determine/calculate the overall path of the connected device. When calculating three dimensional movement of the connected device, the movements may be split into rotational movements and translational movements. With the different types of movements, there may also be different motion tracks for rotational movements in relation to the feature of the multiple frames and for translational movements in relation to the feature, in order to accurately represent and determine the three dimensional movement of the connected device. When the motion tracks of the feature(s) are calibrated with the movements of the connected device, the motion tracks (i.e., a rotational motion track and a translational motion track) also have to be calibrated, or correlated, with each other in order to determine an overall three dimensional movement path of the connected device. In some embodiments, when there are multiple connected devices, calculating the video movement is repeated for each connected device using their corresponding video information to determine video movement for each connected device.

In some embodiments, the connected device includes an accelerometer. If the connected device includes an accelerometer, accelerometer data may be included in the video information and may be used to calculate the video movement. The accelerometer may increase the accuracy of calculating the video movement, as acceleration data is included in the calculation.

In some embodiments, a server is configured to execute operation 160 to determine whether there are matching movements (i.e., whether the visible movement matches the estimated movement). Once the linking device has connected to a device (i.e., the connected device), the linking device may want to determine whether or not the connected device is a device visible through its camera, so the linking device may validate whether the movement (i.e., video movement) of the video information it is receiving (from the connected device) matches the movement (i.e., visible movement) of a visible device that the linking device can see through its camera. The validation of whether the movements match may determine whether the linking device can see the device it is connected to, and may help identify and locate the connected device. In some embodiments, determining whether there are matching movements includes identifying a path of the video movement for the connected device, identifying a path of the visible movement for the visible device, and determining whether the path of the video movement matches the path of the visible movement. In some embodiments, a path is a visual representation of the movement. In some embodiments, the path may be a series of coordinates representing the movement of the device. In some embodiments, the path may be a vector, or a series of vectors, representing the movement of the device.

In some embodiments, determining whether there are matching movements includes determining whether the video movements and the visible movements have a similarity value that is above a threshold. In some embodiments, determining whether there are matching movements is done through machine learning using a neural network. The various movements (e.g., rotation, direction, angular frequency, translation, etc.) calculated from each feed (i.e., the video information from each connected device and the camera feed from the linking device) may be the input of the machine learning, and the output, or outcome, of the machine learning may be whether or not the inputs match. Through training, the machine learning vectors may improve at linking the matching feeds, or determining whether the inputs match.

In some instances, there may be multiple visible devices that are identified (or are visible) in the camera feed of the linking device. In such instances, the linking device may compare the video movement of the device with which it is currently connected to the visible movement for each visible device. Here, the linking device may determine the movement of the device it is connected to, and may try to match that movement with the movement of the visible devices identified on the camera feed of the linking device, to see whether one of the connected devices on the camera feed is the device with which the linking device is connected. This may be repeated for each device with which the linking device is currently communicating, so that the linking device may attempt to match the movement of each visible device (determined using the camera feed of the linking device) to movement calculated from each connected device's provided video information.

In some embodiments, the movements from a plurality of visible devices may match. For example, multiple visible movements may match a single video movement, or vice versa. In some embodiments, the movement with the highest match similarity to the other movement (e.g., the visible movement that most matches, or is most similar to, the video movement) is selected as the matching movement. Match similarity may be a representation (e.g., numerical) of how equivalent, or similar, the visible movement is to the video movement, or vice versa. For example, the visible movement may have a 90% match similarity to the video movement, which indicates that only 10% of the visible movement is not an exact match, or is not similar, to the video movement. In some embodiments, the movements continue to be compared (i.e., continuing to determine whether movements from the video movement match movement from the visible movement) until a single video movement matches a single visible movement. The video movement and visible movement may continue to change, or evolve, as the visible device and the connected device, respectively, continue to move. As the movements evolve, visible movements may be eliminated once they no longer match the video movement. Eventually, once all other visible movements are eliminated, a single visible movement may remain as matching the video movement.

In some embodiments, if the video movements match the visible movements, the server concludes that the visible device is the connected device in operation 170. As discussed herein, the linking device may be communicating with a device (i.e., a connected device) that it does not know the exact location of. The linking device may also identify a device (or devices) that is visually detected through a camera of the linking device. To determine the location of the connected device, the linking device may determine whether the movements of the connected device match the movements of the visible device. In operation 170, the server determines that the video movement does match the visible movement, so the server can conclude, because the movements match, the visible device is the connected device. The linking device may then learn, or determine, the location of the device it is connected to (i.e., connected device), because the connected device is the visible device that is visually detected through a camera of the linking device.

In some embodiments, a server is configured to execute operation 180 to link the visible device with the connected device. Linking the devices may include connecting, or associating, the visible device with the corresponding connected device. Once the devices are linked, the visible device and the corresponding connected device may be viewed as the same device. In some embodiments, linking the devices includes merging, or combining, the known data for the connected device with the known data for the visible device to form a more complete data set for the single, or same, device. Linking the devices may include updating the data for the connected device to include the data for the visible device (e.g., location data and details about the appearance of the visible device). In some embodiments, the linking device may link the connected device that it received the video information from with the visible device with matching visible movements, identified through the camera feed of the linking device. In other words, the linking device may link the device it sees with the device that it has connected with. In some embodiments, the connected device is a device that the linking device is currently connected to. In some embodiments, the connected device is a device that the linking device previously connected to in order to receive the video information from the connected device (or one of the connected devices).

In some embodiments, linking the visible device with a corresponding connected device allows the linking device to identify a specific location of the connected device it is (or has) connected to. The linking device can visibly detect and view the connected device through its camera, so the linking device may be able to determine the specific location of the connected device using the camera view. This may give the linking device very accurate information of where the device it is communicating with is positioned, which may allow for added functionalities, discussed above.

If the server determines in operation 160 that video movements do not match the visible movements, the server concludes that the linking device is not communicating with a visible device in operation 165. In some embodiments, the video movements do not match the visible movements. When the movements do not match, it is likely that the device that the linking device is communicating with may not be visible through the linking device's camera feed. If the linking device is not communicating with a visible device, the linking device may not gain information of where the device it is communicating with is located. In some embodiments, if the linking device has a moveable, or rotating, camera, the linking device may reposition the camera when it is determined that the movements do not match. Because it is likely that the linking device is not communicating with a visible device, repositioning the camera may allow for additional devices to be identified/detected through the camera. Once, the camera has been repositioned, the server may start again with operation 110.

Figure 2:
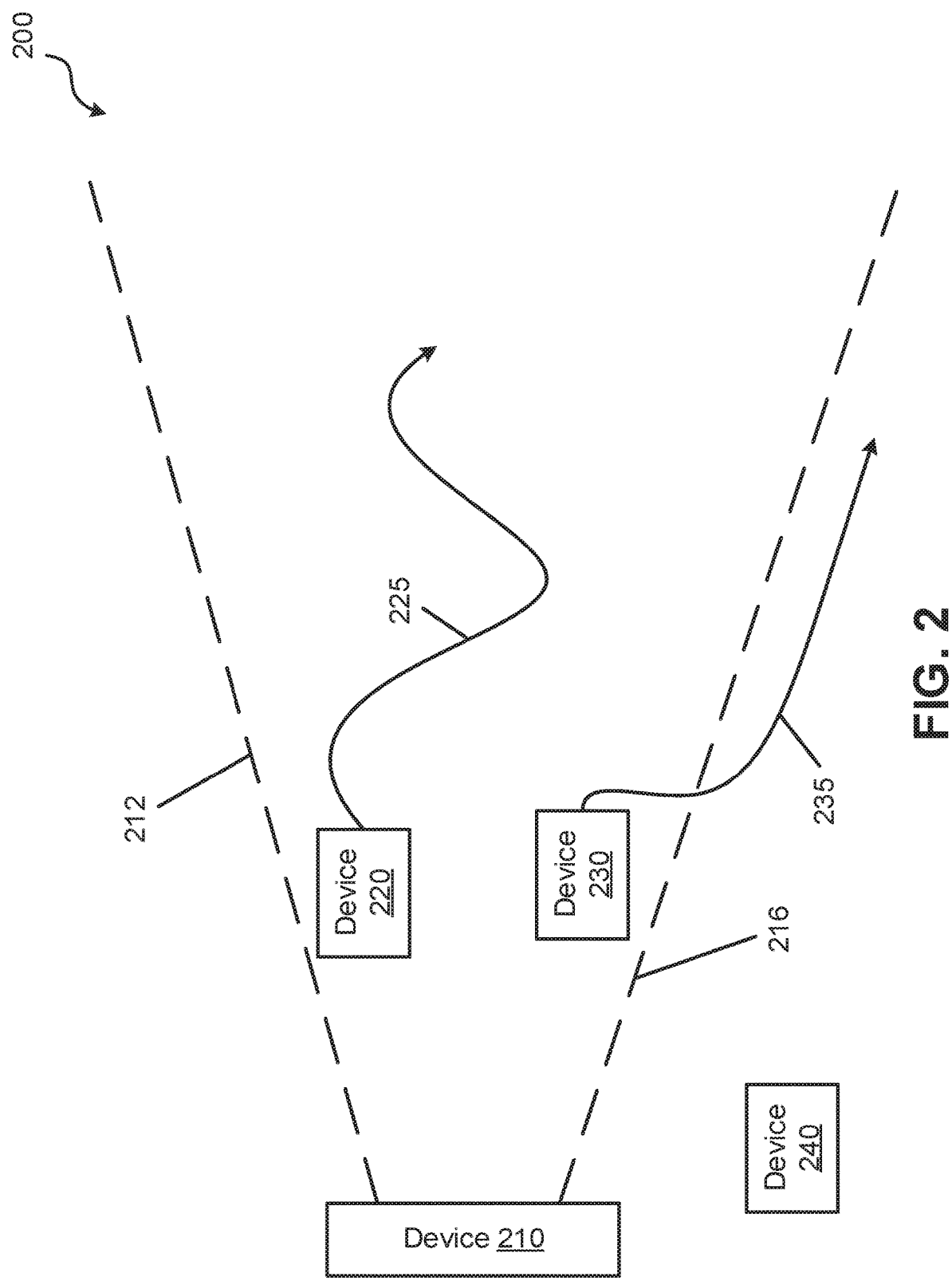
FIG. 2 depicts a schematic diagram of a first example device detection environment, according to some embodiments.

Referring to FIG. 2, a schematic diagram of an example device detection environment 200 is depicted, according to some embodiments. Device detection environment 200 includes device 210, device 220, device 230, and device 240. In some embodiments, device 210 is the linking device. Device 210 may include a camera that has boundaries 212 and 216. Anything located outside of boundaries 212 and 216 may not be visible through the camera feed of device 210. In device detection environment 200, device 220 is a visible device because it is visible through the camera feed of device 210. Device 220 may move along path 225. In some embodiments, because device 220 is visible through the camera feed of device 210, device 210 can calculate the visible movement as movement path 225. In some embodiments, the video information provided by device 220 may be used to calculate the video movement of device 220 as movement path 225. Here, the visible movement and video movement may match because they can both be calculated to be movement path 225.

Device detection environment 200 also includes device 230, which is a visible device because it is within the boundaries 212 and 216. Device 230 may move along path 235. The video information provided by device 230 may be used to calculate the video movement of device 230 as movement path 235. However, because path 235 goes outside of the boundaries 212 and 216 of the camera of device 210, device 210 may not be able to calculate an accurate visible movement for device 230. In this instance, the visible movement and video movement of device 230 may not match, because there is not an accurate visible movement for device 230.

Device detection environment 200 also includes device 240, which is not a visible device because it is not located within the boundaries 212 and 216 of the camera of device 210. In some embodiments, device 210 is communicating with device 240, but because device 240 is not visible to device 210, there is no visible movement for device 240. This may correspond to operation 180 of FIG. 1.

Figure 3:
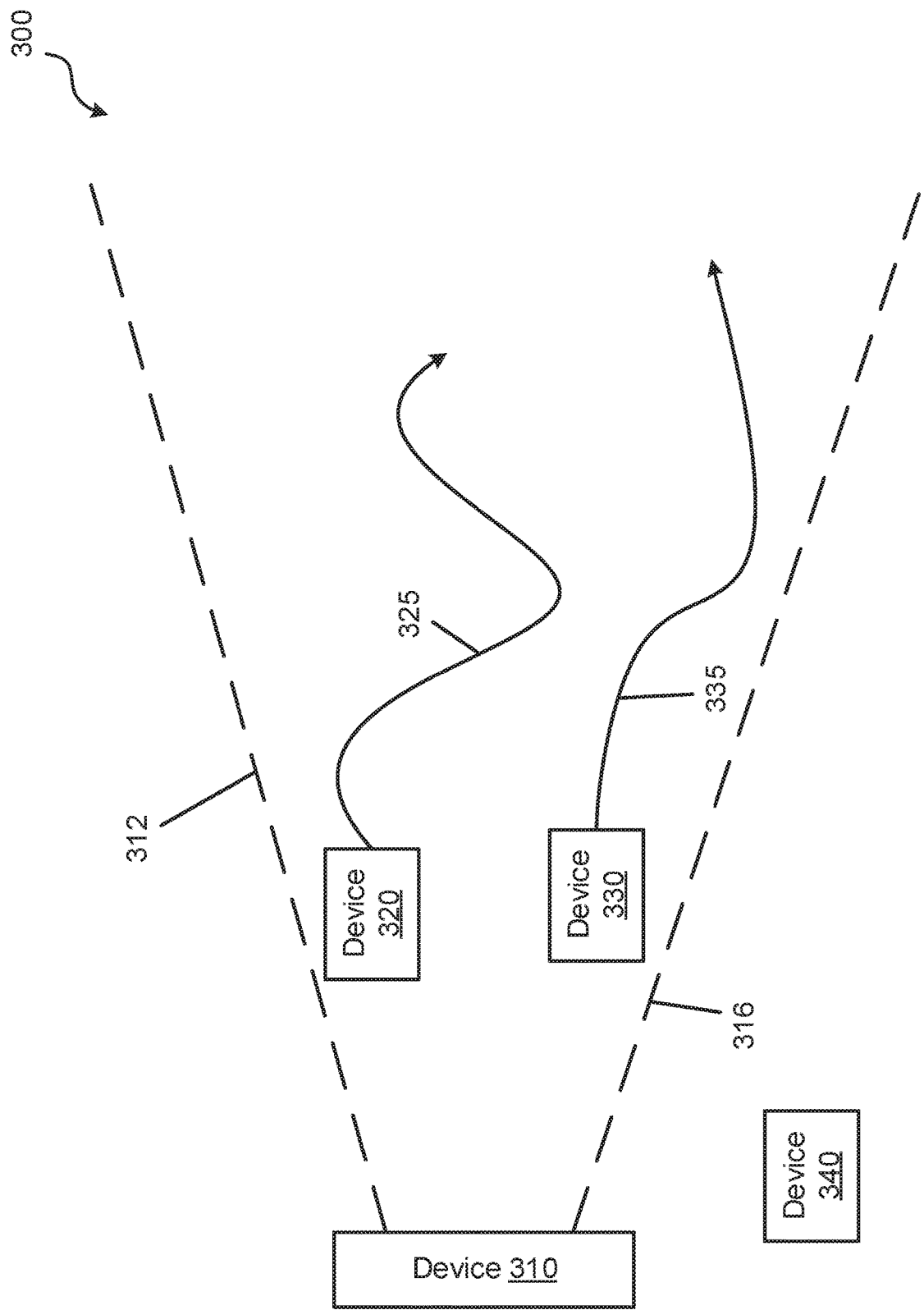
FIG. 3 depicts a schematic diagram of a second example device detection environment, according to some embodiments.

Referring to FIG. 3, a schematic diagram of an example device detection environment 300 is depicted, according to some embodiments. Device detection environment 300 includes device 320, device 330, and device 340. In some embodiments, device 310 is the linking device, and includes a camera that has boundaries 312 and 316. Anything located outside of boundaries 312 and 316 may not be visible through the camera feed of device 310. In device detection environment 300, both device 320 and device 330 are located within boundaries 312 and 316, so both devices are visible devices. In some embodiments, device 320 moves along motion path 325 and device 330 moves along motion path 335.

In some embodiments, device 310 is communicating with device 320. Using the video information from device 320, the video movement of device 320 may be calculated to be path 325. In some embodiments, because there are two visible devices for device 310, the visible movement for device 320 calculated using the camera feed of device 310 could be either path 325 or path 335. When determining whether the visible movement matches the video movement, it may be determined that the visible movement of path 325 matches the video movement for device 320, and therefore device 320 is linked as the device that device 310 is communicating with (i.e., the corresponding connected device).

In some embodiments, device 310 is communicating with device 330. Using the video information from device 330, the video movement of device 330 may be calculated to be path 335. Like above, because both devices 320 and 330 are visible through the camera of device 310, the visible movement for device 330 could be calculated to be either path 325 or 335. When comparing the video movement to the visible movement, it may be determined that visible movement path 335 matches video movement path 335 and device 330 may be linked as the corresponding connected device.

Device detection environment 300 also includes device 340, which is not a visible device because it is not located within the boundaries 312 and 316 of the camera of device 310. In some embodiments, device 310 is communicating with device 340, but because device 340 is not visible to device 310, there is no visible movement for device 340. This may correspond to operation 180 of FIG. 1.

Figure 4:
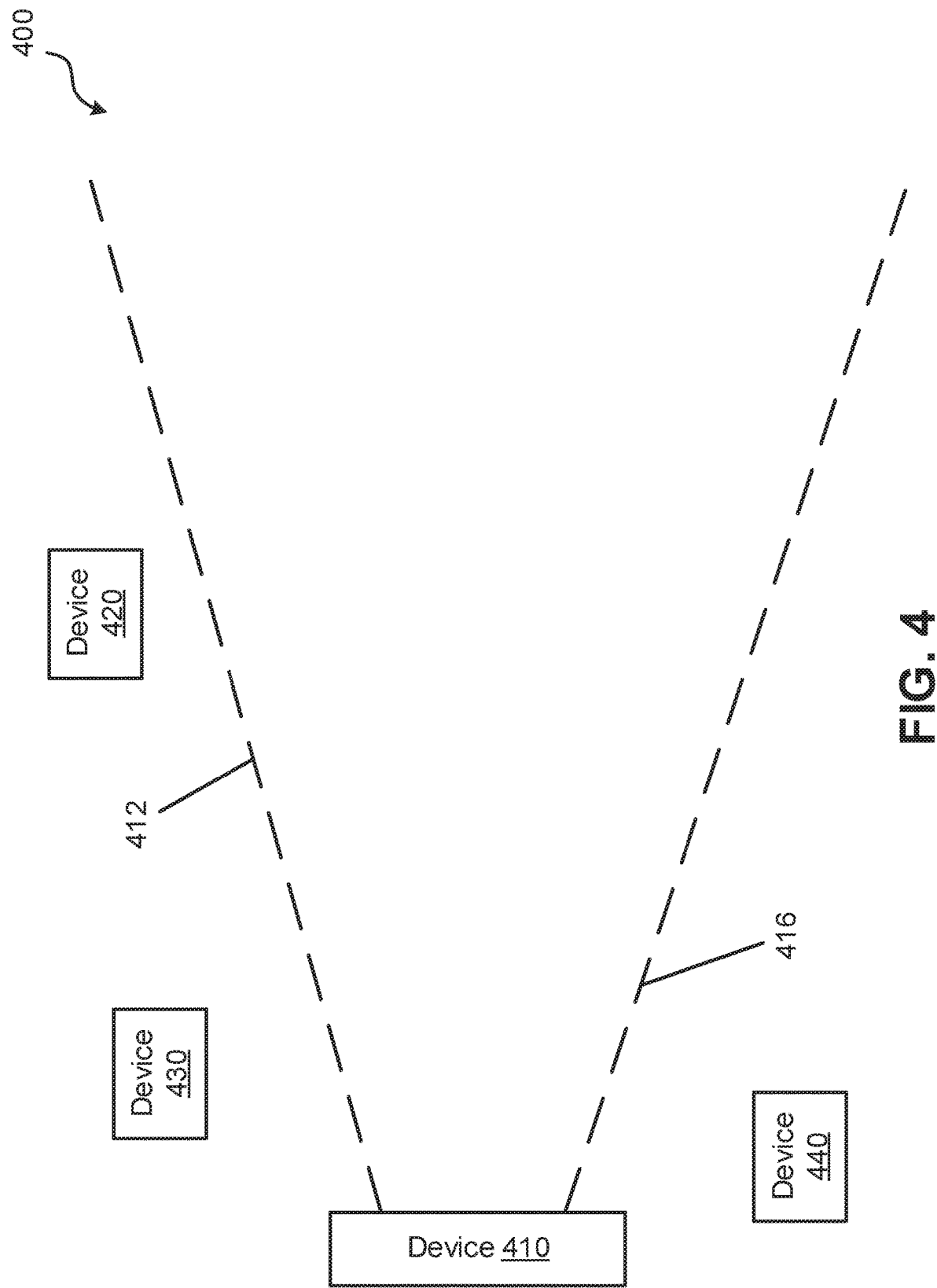
FIG. 4 depicts a schematic diagram of a third example device detection environment, according to some embodiments.

Referring to FIG. 4, a schematic diagram of an example device detection environment 400 is depicted, according to some embodiments. Device detection environment 400 includes device 420, device 430, and device 440. In some embodiments, device 410 is the linking device, and includes a camera that has boundaries 412 and 416. Anything located outside of boundaries 412 and 416 may not be visible through the camera feed of device 410. In device detection environment 400, device 420, device 430, and device 440, are all located outside of boundaries 412 and 416, therefore none of the devices 420, 430, 440 are visible devices. In this device detection environment 400, device 410 may be communicating with any of the other devices, but the video movement of each device 420, 430, 440 would not match any calculated visible movements using the camera feed from device 410, because the devices 420, 430, and 440 are not visible by device 410.

Referring to FIG. 5, computer system 500 is a computer system/server 502 is shown in the form of a general-purpose computing device, according to some embodiments. In some embodiments, computer system/server 502 is located on the linking device. In some embodiments, computer system 502 is connected to the linking device. The components of computer system/server 502 may include, but are not limited to, one or more processors or processing units 510, a system memory 560, and a bus 515 that couples various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the disclosure.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
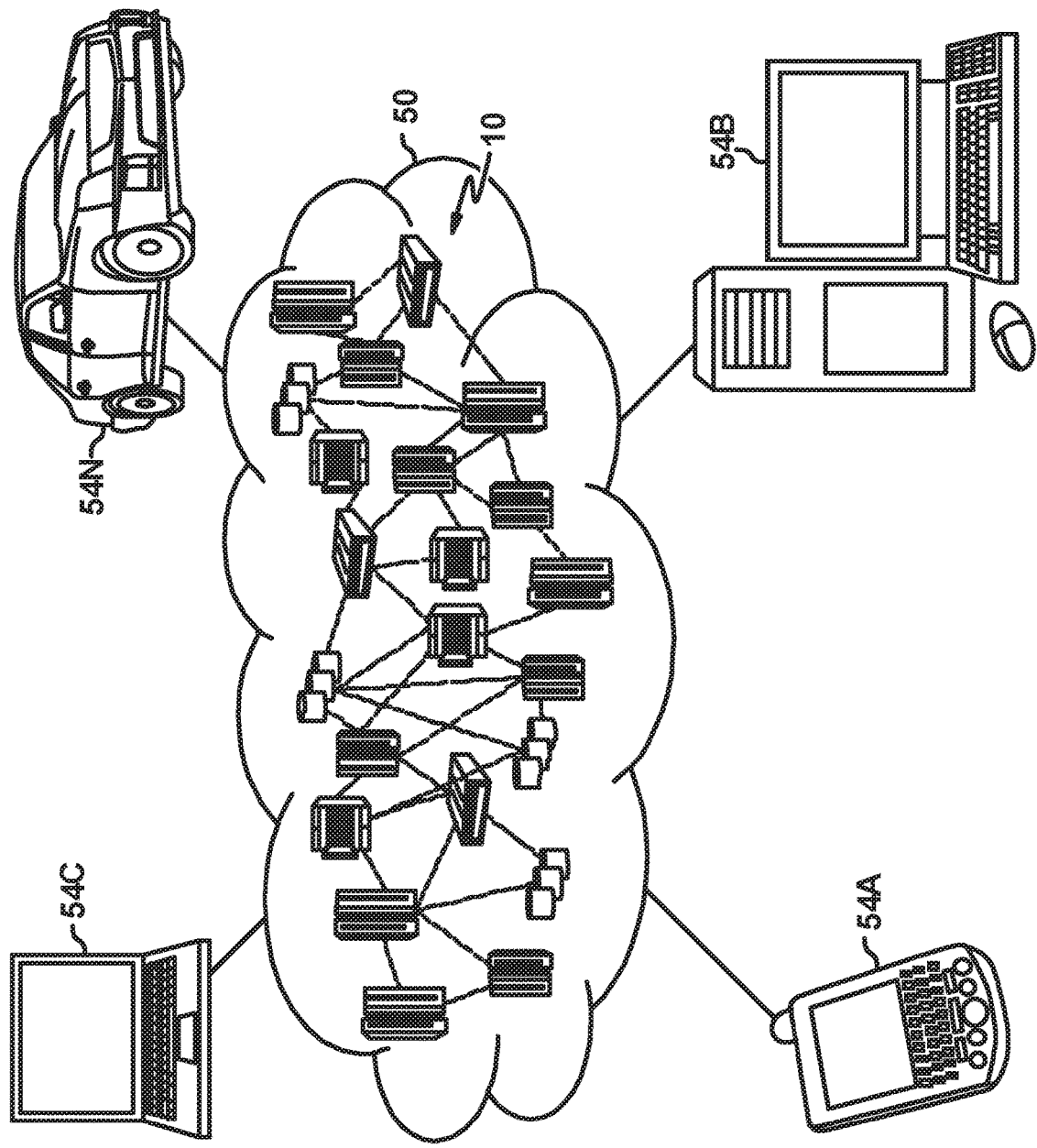
FIG. 6 depicts a cloud computing environment, according to some embodiments.

Referring now to FIG. 6, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
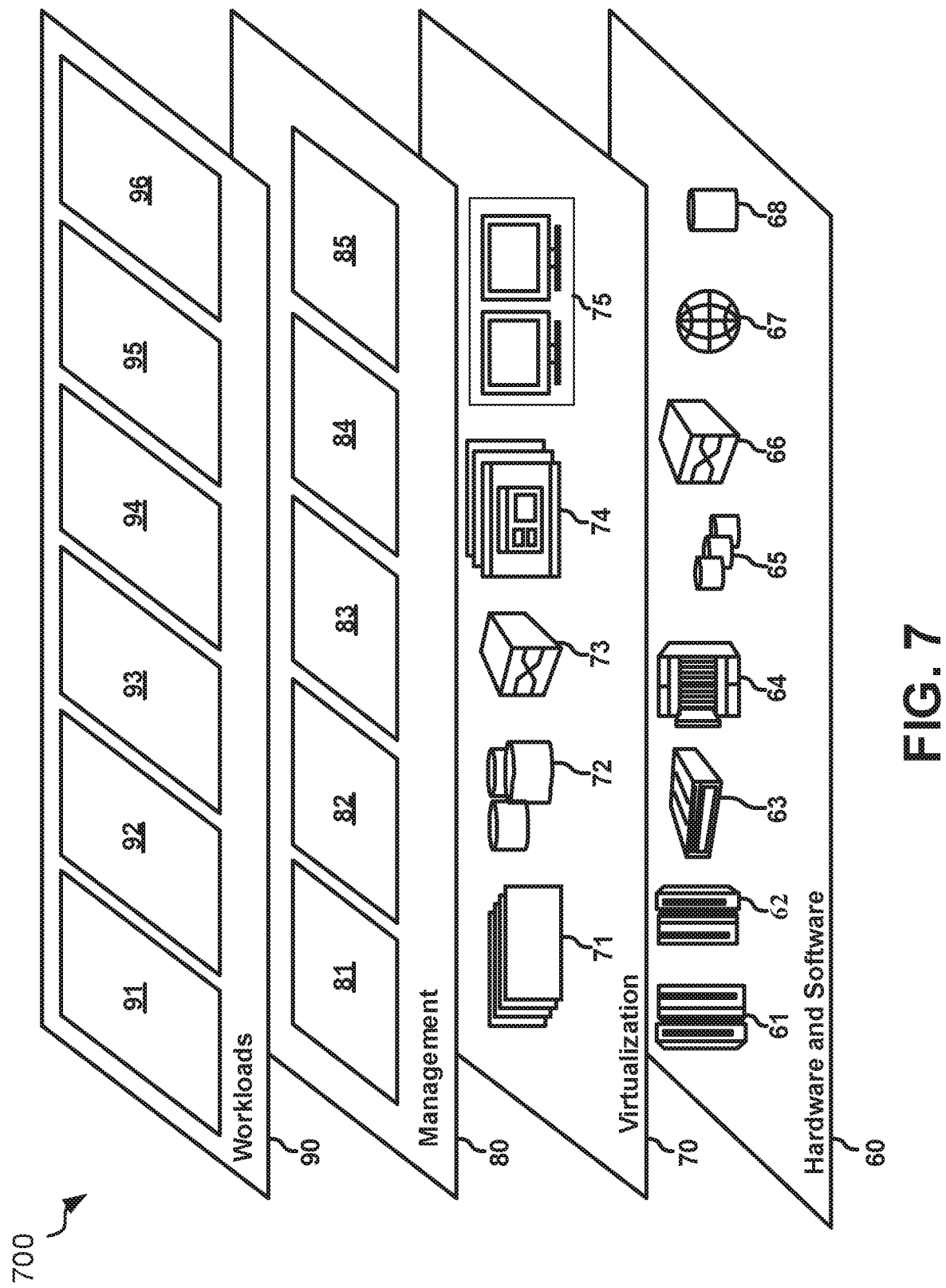
FIG. 7 depicts abstraction model layers, according to some embodiments.

Referring now to FIG. 7, a set of functional abstraction layers 700 provided by cloud computing environment 50 (FIG. 6) is shown, according to some embodiments. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and camera data processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a visible device that is visible through a camera feed of a linking device;
   identifying a connected device that is connected to the linking device;
   determining visible movement of the visible device;
   requesting video information from the connected device, wherein the video information is data of a video stream from a camera of the connected device;
   calculating, using the video information from the connected device, video movement of the connected device;
   determining that the visible movement matches the video movement;
   concluding, based on the determining, that the visible device is the connected device; and
   linking, based on the concluding, the visible device and the connected device.

2. The method of claim 1, wherein determining visible movement includes calculating a rotation, direction, and angular frequency of the one or more visible devices.

3. The method of claim 1, wherein calculating video movement includes calculating at least a rotation and translation of the one or more visible devices.

4. The method of claim 1, wherein determining that the visible movement matches the video movement comprises:
   identifying a path of the video movement for the connected device;
   identifying a path of the visible movement for the visible device; and
   determining whether the path of the video movement matches the path of the visible movement.

5. The method of claim 4, wherein the visible device includes a plurality visible devices, further comprising:
   determining that a plurality of paths of visible movement from the plurality of the visible devices match the path of video movement; and
   selecting the path of visible movement with a highest match similarity to the video movement as a match.

6. The method of claim 4, wherein the visible device includes a plurality visible devices, further comprising:
   determining that a plurality of paths of visible movement from the plurality of the visible devices match the path of video movement; and
   comparing the plurality of paths of visible movement to the path of video movement as at least the path of video movement evolves, until a single path of visible movement matches the path of video movement.

7. The method of claim 1, wherein the visible movement is determined using a constantly running video feed from the camera of the linking device.

8. The method of claim 1, wherein the visible movement is determined using a video feed that is activated by a trigger to begin monitoring the visible device.

9. The method of claim 1, wherein linking the visible device and the connected device includes mapping location data for the visible device with connection data for the connected device to form a more complete data set for the connected device.

10. The method of claim 1, wherein the linking device has knowledge of a device type of the connected device and the identifying the visible device further comprises:

identifying the visible device with the device type of the connected device.

11. The method of claim 1, wherein the identifying the visible device includes identifying the visible device including a camera visible to the linking device.

12. A system having one or more computer processors, the system configured to:
   identify a visible device that is visible through a camera feed of a linking device;
   identify a connected device that is connected to the linking device;
   determine visible movement of the visible device;
   request video information from the connected device, wherein the video information is data of a video stream from a camera of the connected device;
   calculate, using the video information from the connected device, video movement of the connected device;
   determine that the visible movement matches the video movement;
   conclude, based on the determining, that the visible device is the connected device; and
   link, based on the concluding, the visible device and the connected device.

13. The system of claim 12, wherein determining visible movement includes calculating a rotation, direction, and angular frequency of the one or more visible devices.

14. The system of claim 12, wherein calculating video movement includes calculating at least a rotation and translation of the one or more visible devices.

15. The system of claim 12, wherein comparing the video movement to the visible movement comprises:
   identifying a path of the video movement for the connected device;
   identifying a path of the visible movement for the visible device; and
   determining whether the path of the video movement matches the path of the visible movement.

16. The system of claim 15, wherein the one or more visible devices is comprised of a plurality of at least two visible devices, further comprising:
   determining that a plurality of paths of visible movement from the plurality of the visible devices match the path of video movement; and
   selecting the path of visible movement with a highest match similarity to the video movement as a match.

17. The system of claim 15, wherein the one or more visible devices is comprised of a plurality of at least two visible devices, further comprising:
   determining that a plurality of paths of visible movement from the plurality of the visible devices match the path of video movement; and
   comparing the plurality of paths of visible movement to the path of video movement as at least the path of video movement evolves, until a single path of visible movement matches the path of video movement.

18. A computer program product comprising a computer readable storage medium having program instructions embodied therewith, the program instructions executable by a server to cause the server to perform a method, the method comprising:
   identifying a visible device that is visible through a camera feed of a linking device;
   identifying a connected device that is connected to the linking device;
   determining visible movement of the visible device;
   requesting video information from the connected device, wherein the video information is data of a video stream from a camera of the connected device;
   calculating, using the video information from the connected device, video movement of the connected device;
   determining that the visible movement matches the video movement;
   concluding, based on the determining, that the visible device is the connected device; and
   linking, based on the concluding, the visible device and the connected device.

19. The computer program product of claim 18, wherein comparing the video movement to the visible movement comprises:
   identifying a path of the video movement for the connected device;
   identifying a path of the visible movement for the visible device; and
   determining whether the path of the video movement matches the path of the visible movement.

20. The computer program product of claim 19, wherein the one or more visible devices is comprised of a plurality of at least two visible devices, further comprising:
   determining that a plurality of paths of visible movement from the plurality of the visible devices match the path of video movement; and
   selecting the path of visible movement with a highest match similarity to the video movement as a match.

* * * * *